(12) United States Patent
Kuo et al.

(10) Patent No.: US 10,318,463 B2
(45) Date of Patent: Jun. 11, 2019

(54) INTERFACE CONTROLLER, EXTERNAL ELECTRONIC DEVICE, AND EXTERNAL ELECTRONIC DEVICE CONTROL METHOD

(71) Applicant: VIA TECHNOLOGIES, INC., New Taipei (TW)

(72) Inventors: Chia-Ying Kuo, New Taipei (TW); Yi-Lin Lai, New Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 33 days.

(21) Appl. No.: 14/452,784

(22) Filed: Aug. 6, 2014

(65) Prior Publication Data

US 2015/0089088 A1 Mar. 26, 2015

Related U.S. Application Data

(60) Provisional application No. 61/882,841, filed on Sep. 26, 2013.

(30) Foreign Application Priority Data

Mar. 17, 2014 (TW) .............................. 103109867 A

(51) Int. Cl.
*G06F 13/40* (2006.01)
*G06F 13/20* (2006.01)

(52) U.S. Cl.
CPC .......... *G06F 13/4086* (2013.01); *G06F 13/20* (2013.01)

(58) Field of Classification Search
CPC ... G06F 3/00; G06F 3/38; G06F 13/00; G06F 15/0225
USPC .......................................................... 710/5
See application file for complete search history.

(56) References Cited

U.S. PATENT DOCUMENTS

| 6,389,495 | B1* | 5/2002 | Larky ................. G06F 13/4291 710/53 |
| 9,430,431 | B2  | 8/2016 | Ke |
| 2009/0193156 | A1* | 7/2009 | Suematsu ............... G06F 1/266 710/14 |
| 2009/0210637 | A1* | 8/2009 | Yung ..................... G06F 13/385 711/154 |

(Continued)

FOREIGN PATENT DOCUMENTS

| CN | 102567249 | 7/2011 |
| TW | M374119 | 2/2010 |
| TW | 201030554 | 8/2010 |

OTHER PUBLICATIONS

Chinese language office action dated Jun. 27, 2016, issued in application No. 201401030975.6.

*Primary Examiner* — Getente A Yimer
(74) *Attorney, Agent, or Firm* — McClure, Qualey & Rodack, LLP

(57) ABSTRACT

An interface controller coupling the main body of an external electronic device to a host, and the electronic device using the interface controller and a control method for the external electronic controller are disclosed. The interface controller has a control unit and a non-volatile memory. The control unit is configured to transmit a termination-on signal to the host when link information retrieved from the main body has been written into the non-volatile memory. When the host issues a link information request in response to the termination-on signal, the control unit uses the link information stored in the non-volatile memory to respond to the link information request.

16 Claims, 3 Drawing Sheets

(56) References Cited

U.S. PATENT DOCUMENTS

| | | | |
|---|---|---|---|
| 2009/0234980 A1* | 9/2009 | Barrenscheen | G06F 1/26 |
| | | | 710/18 |
| 2010/0205454 A1 | 8/2010 | Wu et al. | |
| 2011/0093642 A1* | 4/2011 | Miyasaka | G06F 13/4022 |
| | | | 710/316 |
| 2011/0106984 A1* | 5/2011 | Tanaka | H04L 65/1053 |
| | | | 710/16 |
| 2015/0363131 A1* | 12/2015 | Sinclair | G06F 3/0607 |
| | | | 711/103 |

* cited by examiner

INTERFACE CONTROLLER, EXTERNAL ELECTRONIC DEVICE, AND EXTERNAL ELECTRONIC DEVICE CONTROL METHOD

CROSS REFERENCE TO RELATED APPLICATIONS

This application claims the benefit of U.S. Provisional Application No. 61/882,841, filed Sep. 26, 2013.

This Application claims priority of Taiwan Patent Application No. 103109867, filed on Mar. 17, 2014, the entirety of which is incorporated by reference herein.

BACKGROUND OF THE INVENTION

Field of the Invention

The present invention relates to external electronic devices and control methods thereof and further relates to interface controllers designed for external electronic devices.

Description of the Related Art

To complete the link between a host and an external electronic device, the host has to request link information from the external electronic device. Some of the link information is contained in the main body of the external electronic device and is inaccessible until the main body reaches a stable operation. For example, it requires time for the hard disc to rotate stably since the power-on process of the motor rotates the hard disc. Because of the delay of the link information, the host may erroneously determine that no external electronic device is connected to the host.

BRIEF SUMMARY OF THE INVENTION

An interface controller in accordance with an exemplary embodiment of the disclosure is shown, which couples a main body of an external electronic device to a host. The interface controller includes a non-volatile memory and a control unit. The control unit is configured to transmit a termination-on signal to the host when link information retrieved from the main body has been written into the non-volatile memory. When the host issues a link information request in response to the termination-on signal, the control unit uses the link information stored in the non-volatile memory to respond to the link information request.

In an exemplary embodiment, an external electronic device comprising the interface controller and the main body is shown.

A control method for an external electronic device in accordance with an exemplary embodiment of the disclosure comprises the following steps: providing an interface controller to couple a main body of the external electronic device to a host; retrieving link information from the main body and writing the link information into a non-volatile memory; transmitting a termination-on signal to the host after writing the link information into the non-volatile memory; and using the link information stored in the non-volatile memory to respond to a link information request that is issued by the host in response to the termination-on signal.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
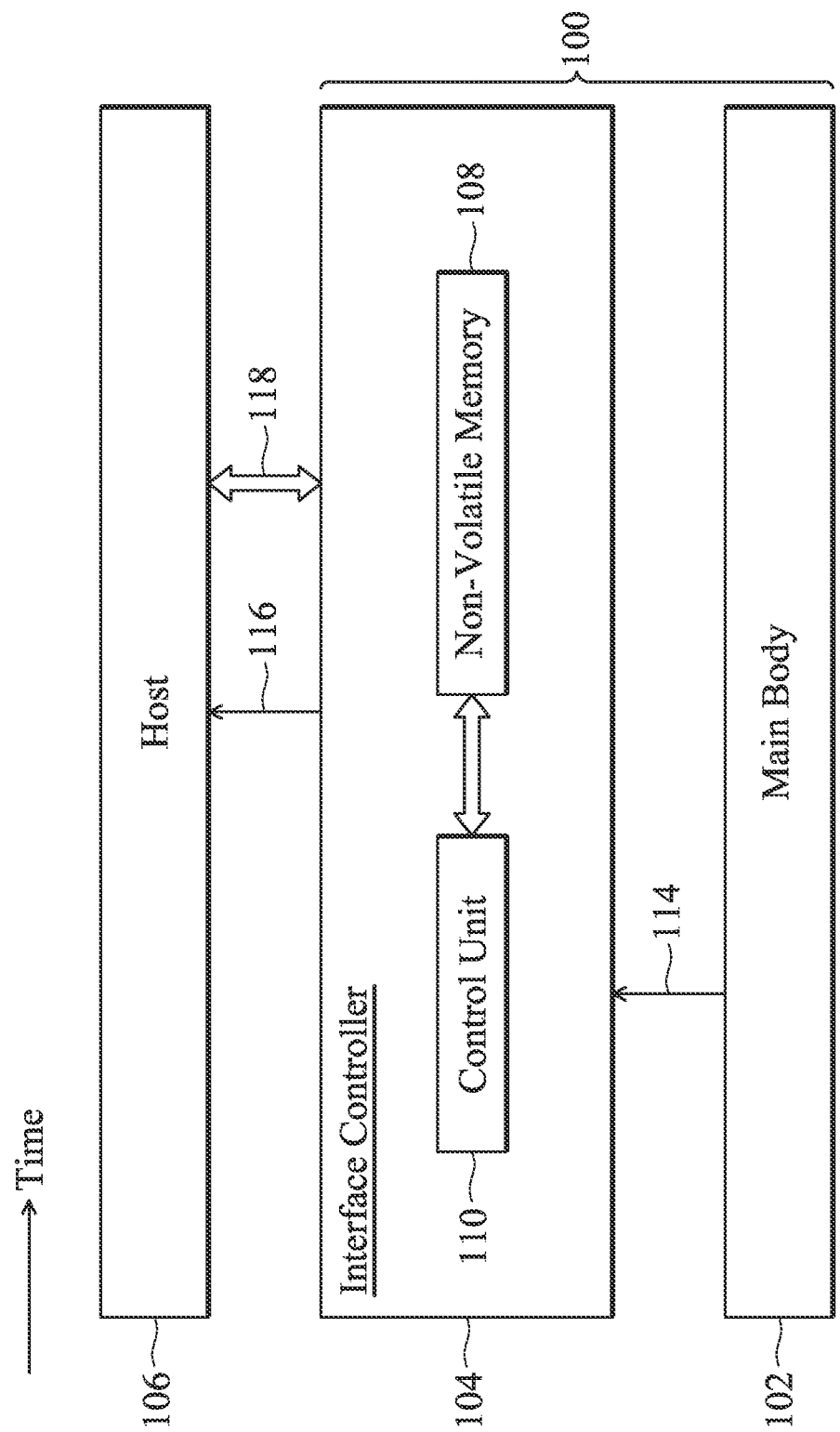
FIG. 1 depicts an external electronic device 100 in accordance with an exemplary embodiment of the disclosure.

FIG. 1 depicts an external electronic device 100 in accordance with an exemplary embodiment of the disclosure, which comprises a main body 102 and an interface controller 104. The interface controller 104 couples the main body 102 to a host 106. The interface controller 104 comprises a non-volatile memory 108 and a control unit 110.

In FIG. 1, the events between the interface controller 104, the main body 102 and the host 106 are numbered 114, 116 and 118 from earlier to later. The main body 102 reaches a stable operation before event 114. By event 114, the control unit 110 of the interface controller 104 retrieves link information from the main body 102 and writes the link information retrieved from the main body 102 into the non-volatile memory 108. Event 116 is scheduled after event 114 (link information retrieving). By event 116, the control unit 110 transmits a termination-on signal to the host 106. By event 118, the host 106 issues a link information request in response to the termination-on signal. In one embodiment, the interface controller 104 communicates with the host 106 via universal serial bus (USB), the host 106 performs an enumeration process during event 118 in response to the termination-on signal. The link information request includes at least one setup command issued during the enumeration process. Preferably the setup command may be a port address setting command (Set_Address), a get descriptor command (Get_Descriptor) and so on. Furthermore, by event 118, the control unit 110 uses the link information stored in the non-volatile memory 108 to respond to the link information request issued from the host 106 and thereby the enumeration process performed on the external electronic device 100 by the host 106 is accomplished to complete the link between the interface controller 104 and the host 106.

In an exemplary embodiment, when a link trigger between the interface controller 104 and the host 106 is asserted, the control unit 110 determines whether link information contained in the main body 102 has been written into the non-volatile memory 108. When the link information is not stored in the non-volatile memory 108 yet, the control unit 110 waits for the main body 102 to reach a stable operation. After the main body 102 reaches the stable operation, the control unit 110 retrieves the link information from the main body 102 and writes the link information retrieved from the main body 102 into the non-volatile memory 108 (by event 114) and then outputs the termination-on signal to the host 106 (by event 116). When the link trigger is asserted and the link information is already stored in the non-volatile memory 108, the control unit 110 transmits the termination-on signal to the host 106 in response to the asserted link trigger and uses the link information stored in the non-volatile memory 108 to respond to the link information request no matter whether the main body 102 reaches the stable operation.

In some exemplary embodiments, the link trigger between interface controller 104 and the host 106 is asserted when the host 106 supplies power to the external electronic device 100. In one embodiment, the interface controller 104 communicates with the host 106 via universal serial bus (USB) interface, and the link trigger is the voltage variations on the D+ and D− connection terminals of USB connector. In other exemplary embodiments, the link trigger may be asserted when the external electronic device 100 is physically connected to the host 106 or when the host 106 is resumed from sleep mode. In an exemplary embodiment, the external electronic device 100 switches to a sleep state from a normal working state accomplishing with the host 106 entering sleep mode (e.g. S3 or S4 power state). When resuming from sleep mode, the host 106 may wake up the external electronic device 100 accordingly and thereby the link trigger is asserted. It takes a long time for the main body 102 to reach a stable operation to provide the link information. It may be too late if the termination-on signal is transmitted after the main body 102 reaches the stable operation. The host 106 waiting for the termination-on signal for a long time may erroneously determine that the external electronic device 100 has been disconnected from the host 106. In cases wherein the host 106 was copying data of the main body 102 before sleep mode, the host 106 resuming from sleep mode and erroneously determining that the external electronic device 100 has been disconnected from the host 106 may regard the external electronic device 100 as a new device and thereby the interrupted copy operation fails. However, according to the disclosure, when the host 106 resumes from sleep mode and the link trigger is asserted accordingly, the link information previously loaded in the non-volatile memory 108 is still available. Thus, the interface controller 104 may output the termination-on signal to the host 106 in response to the asserted link trigger without waiting for the main body 120 to reach the stable operation. No time is wasted in waiting for the main body 102 to reach the stable operation. The external electronic device 100 is not erroneously regarded as a newly plugged-in device.

In an exemplary embodiment, the control unit 110 retrieves at least one of a vendor identification number (VID), a product identification number (PID), a device serial number and a product string from the main body 102 as the link information to be written into the non-volatile memory 108.

Figure 2:
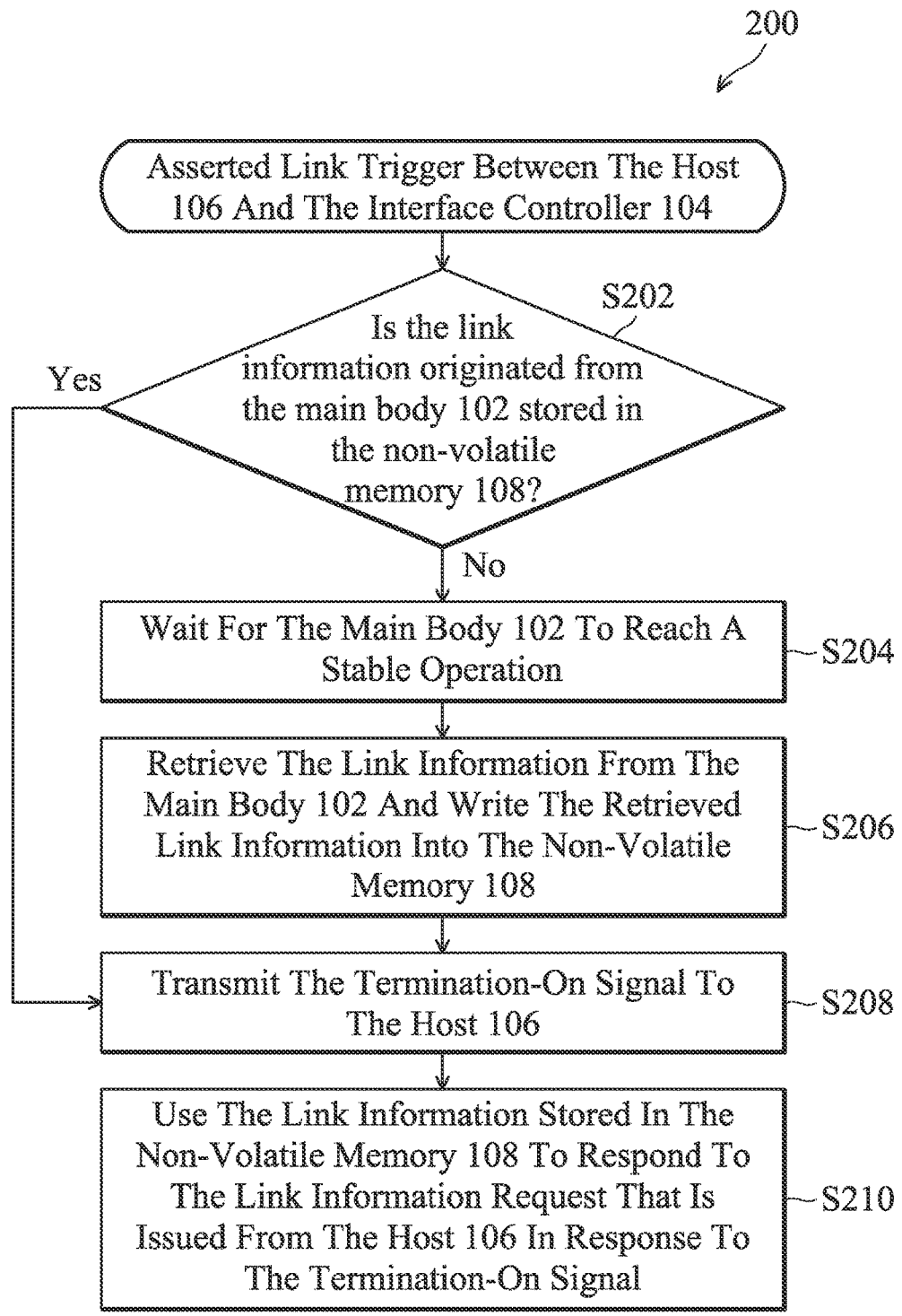
FIG. 2 is a flowchart depicting a control method 200 for an external electronic device in accordance with an exemplary embodiment of the disclosure.

FIG. 2 is a flowchart depicting how the control unit 110 works when a link trigger between the interface controller 104 and the host 106 is asserted. In a case wherein the host 106 supplies power to the external electronic device 100 via universal serial bus (USB) interface, the link trigger is asserted according to the voltage variations on the D+ and D− terminal of USB connector connecting the host 106 and the interface controller 104. In step S202, the non-volatile memory 108 is checked to ensure whether link information originating from the main body 102 is already stored in the non-volatile memory 108. When it is determined in step S202 that the link information is not stored in the non-volatile memory 108 yet, step S204 is performed to wait for the main body 102 to reach a stable operation. Once the main body 102 reaches the stable operation, step S206 is performed to read the main body 102 for the link information and write the link information into the non-volatile memory 108. After step S206, step S208 is performed to transmit a termination-on signal to the host 106. In step S210, the link information retrieved from the main body 102 and stored in the non-volatile memory 108 is transmitted to the host 106 in response to at least one link information request. The at least one link information request is issued by the host 106 in response to the termination-on signal.

When it is determined in step S202 that the link information originated from the main body 102 is stored in the non-volatile memory 108, steps S204 and S206 are skipped and step S208 is performed. Thus, the termination-on signal, in response to the asserted link trigger, is transmitted to the host 106 no matter whether the main body 102 reaches the stable operation. Step S210 is performed after step S208. In step S210, the link information retrieved from the main body 102 and stored in the non-volatile memory 108 is transmitted to the host 106 in response to at least one link information request. The at least one link information is issued by the host 106 in response to the termination-on signal.

All in all, no matter whether the main body 102 reaches a stable operation, the link information request issued from the host 106 in response to the termination-on signal is timely responded by the link information stored in the non-volatile memory 108.

The power states S3 or S4 are discussed in this paragraph. When the host 106 enters sleep mode (S3 or S4 power state), the external electronic device 100 may switch to a sleep state accordingly. When the host 106 resumes and thereby a link trigger between the host 106 and the external electronic device 100 is asserted, considerable time is required for the start-up main body 102 to reach a stable operation. Fortunately, according to the disclosed technique, the link information must have been ready in the non-volatile memory 108 before the sleep state. Thus, when the control unit 110 resumes from the sleep state, steps S204 and S206 are skipped and step S208 is performed in accordance with that shown in FIG. 2. The link between the host 106 and the external electronic device 100 is successfully established no matter of whether the main body 102 reaches the stable operation. The host 106 does not erroneously recognize the external electronic device just resumed from the sleep state as a reconnected device.

In an exemplary embodiment, a sleep state indicator is provided to indicate whether the host 106 resumed from sleep mode. The sleep state indicator may be a software flag, which is asserted when the host 106 enters sleep mode. When the host 106 resumed from the sleep state and the link trigger between the host 106 and the interface controller 104 is asserted, the control unit 110 observes that the sleep state indicator has been asserted. According to the asserted sleep state indicator, the control unit 110 determines that link information originated from the main body 102 is already stored in the non-volatile memory 108. Thus, steps S204 and S206 are skipped and step S208 is performed. The link between the host 106 and the external electronic device 100 is successfully established even though the main body 102 resumed from the sleep state has not reached the stable operation. It is because steps S204 and S206 have been performed to retrieve the link information from the main body 102 and write the link information into the non-volatile memory 108 at the first time the external electronic device 100 connected to the host 106. In a case wherein the external electronic device 100 is an add-on card, the host 106 shuts down the power of the external electronic device 100 when entering sleep mode. When the host 106 resumes, the power of the external electronic device 100 is resumed by the host 106 and a link trigger between the host 106 and the external electronic device 100 is asserted. In a case wherein the external electronic device 100 is an on-board card, the power of the external electronic device 100 is uninterrupted when the host 106 enters sleep mode. However, the link trigger between the host 106 and the external electronic device 100 is also asserted when the host 106 wakes up. The external electronic device 100 powered off by the sleep state of the host 106 taking more considerable time to resume (reaching stable operation) especially benefits from the disclosed techniques.

When the main body 102 is swappable, a device indicator is provided to indicate whether the main body 102 has been changed. The device indicator also indicates whether the link information contained in the non-volatile memory 108 is still valid. The control unit 110 may check the device indicator when a link trigger (for example, when the voltage levels of D+ and D− terminals of a USB connector vary) between the host 106 and the interface controller 104 is asserted. When the device indicator indicates that the main body 102 has been changed, it means that the link information stored in the non-volatile memory 108 is invalid now and the control unit 110 determines that the link information originated from the new main body 102 is not ready in the non-volatile memory 108. According to FIG. 2, steps S204 and S206 are performed to update the link information of the new main body 102 into the non-volatile memory 108 and steps S208 and S210 are performed to complete the link between the host 106 and the new main body 102.

Figure 3:
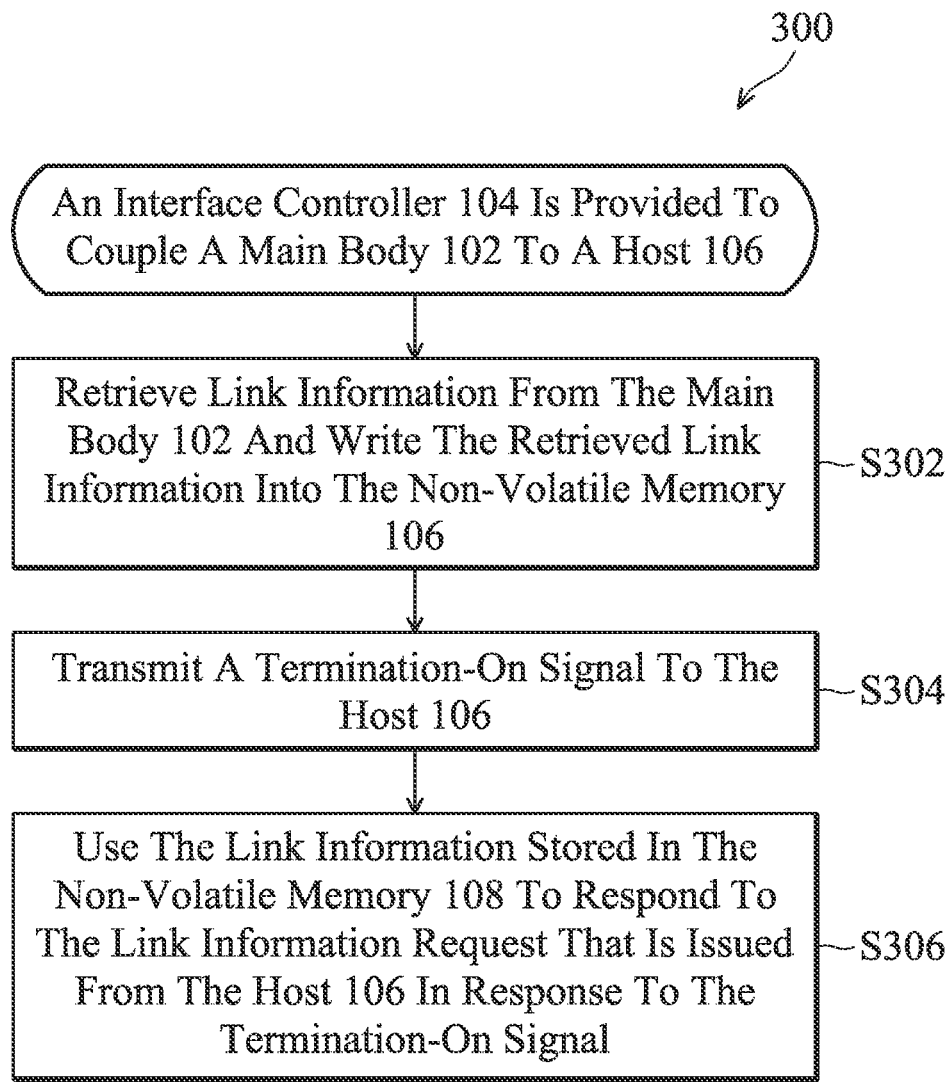
FIG. 3 is a flowchart depicting a control method 300 for an external electronic device in accordance with an exemplary embodiment of the disclosure.

FIG. 3 is a flowchart depicting an external electronic device control method 300 in accordance with an exemplary embodiment of the disclosure. FIG. 3 is discussed with respect to FIG. 1.

To implement the flowchart of FIG. 3, an interface controller 104 is provided to couple a main body 102 to a host 106. In FIG. 3, it is the first time for the external electronic device 100 to connect to the host 106 and link information originated from the main body 102 is not stored in the non-volatile memory 108. Step S302, therefore, is performed to wait for the main body 102 to reach a stable operation. After the main body 102 reaches the stable operation, the link information is retrieved from the main body 102 and written into the non-volatile memory 108. After step S302, step S304 is performed by which a termination-on signal is transmitted to the host 106. In step S306, the link information stored in the non-volatile memory 108 is provided to respond at least one link information request that is issued from the host 106 in response to the termination-on signal.

In a case wherein the main body 102 is a hard disc, the hard disc is inaccessible until the motor of the hard disc rotates stably. A hard disc—especially a large capacity hard disc (>2TB)—takes seconds from start-up to stable rotation. According to the disclosed techniques, the link between the host 106 and the hard disc is successfully established even though considerable time is required for the hard disc to reach stable rotation.

In an exemplary embodiment, the main body 102 communicates with the interface controller 104 via serial advanced technology attachment (SATA) interface and communicates with the host 106 via universal serial bus (USB) interface. For example, the main body 102 may be a SATA hard drive, transformed by the interface controller 104 to communicate with the host 106 via the USB interface. In an exemplary embodiment, the interface controller 104 is a bridge device between the USB communication protocol and the SATA communication protocol. In an exemplary embodiment, the interface controller 104 may be packaged with the main body 102 and is produced as an external electronic device 100 with a USB interface.

Furthermore, the external electronic device control methods of the disclosure are not limited to the architecture shown in FIG. 1. Any technique using the aforementioned concept to control an external electronic device is within the scope of the invention.

While the invention has been described by way of example and in terms of the embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An interface controller, coupling a main body of an external electronic device to a host, comprising:
   a non-volatile memory, different from a non-volatile storage of the main body of the external electronic device, the external electronic device using a motor-driven hard disc as the non-volatile storage provided within the main body; and
   a control unit, configured to transmit a termination-on signal to the host when link information retrieved from the non-volatile storage of the main body has been written into the non-volatile memory, wherein the link information is not initially contained in the non-volatile memory and is written to the non-volatile memory after the motor-driven hard disc rotates stably,
   wherein:
   the termination-on signal is transmitted from the interface controller to the host and, in response to the host receiving the termination-on signal, the host issues a link information request;
   the host issues the link information request after receiving the termination-on signal wherein the termination-on signal shows that the non-volatile memory of the interface controller contains the link information;
   the link information request issued by the host in response to the termination-on signal comprises at least one setup command for an enumeration process for establishing a link to the host; and
   the control unit uses the link information stored in the non-volatile memory to respond to the link information request and the enumeration process is performed to establish the link to the host.

2. The interface controller as claimed in claim 1, wherein the control unit retrieves at least one of a vendor identification number, a production identification number, a device serial number and a product string from the main body as the link information to be written into the non-volatile memory.

3. The interface controller as claimed in claim 1, wherein:
   when a link trigger between the interface controller and the host is asserted, the control unit determines whether the link information is stored in the non-volatile memory; and
   when determining that the link information is not stored in the non-volatile memory, the control unit waits for the main body to reach a stable operation,
   wherein, after the main body reaches the stable operation, the control unit retrieves the link information from the main body, writes the link information retrieved from the main body into the non-volatile memory, and then transmits the termination-on signal to the host.

4. The interface controller as claimed in claim 1, wherein:
when determining that a link trigger between the interface controller and the host is asserted and the link information is stored in the non-volatile memory, the control unit transmits the termination-on signal to the host in response to the asserted link trigger and uses the link information stored in the non-volatile memory to respond to the link information request no matter whether the main body reaches a stable operation.

5. The interface controller as claimed in claim 4, wherein:
the control unit uses a sleep state indicator to indicate whether the host is resumed from sleep mode;
the control unit checks the sleep state indicator when the link trigger between the interface controller and the host is asserted; and
when the sleep state indicator indicates that the host is resumed from sleep mode, the control unit determines that the link information is stored in the non-volatile memory.

6. The interface controller as claimed in claim 4, wherein:
the controller unit uses a device indicator to indicate whether the main body has been changed;
the control unit checks the device indicator when the link trigger between the interface controller and the host is asserted; and
when the device indicator indicates that the main body has not been changed, the control unit determines that the link information is stored in the non-volatile memory.

7. The interface controller as claimed in claim 1, wherein:
the interface controller communicates with the main body via serial advanced technology attachment interface; and
the interface controller communicates with the host via universal serial bus interface.

8. An external electronic device, comprising:
a main body having a motor-driven hard disc as a non-volatile storage; and
an interface controller, coupling the main body to a host and comprising a control unit and a non-volatile memory,
wherein:
the non-volatile memory of the interface controller is different from the non-volatile storage implemented within the main body by the motor-driven hard disc;
the control unit is configured to transmit a termination-on signal to the host when link information retrieved from the non-volatile storage of the main body has been written into the non-volatile memory, wherein the link information is not initially contained in the non-volatile memory and is written to the non-volatile memory after the motor-driven hard disc rotates stably;
the termination-on signal is transmitted from the interface controller to the host and, in response to the host receiving the termination-on signal, the host issues a link information request;
the host issues the link information request after receiving the termination-on signal wherein the termination-on signal shows that the non-volatile memory of the interface controller contains the link information;
the link information request issued by the host in response to the termination-on signal comprises at least one setup command for an enumeration process for establishing a link to the host; and
the control unit is further configured to use the link information stored in the non-volatile memory to respond to the link information request and the enumeration process is performed to establish the link to the host.

9. The external electronic device as claimed in claim 8, wherein the main body is a hard disc.

10. The external electronic device as claimed in claim 8, wherein:
the interface controller communicates with the main body via serial advanced technology attachment interface; and
the external electronic device uses the interface controller to communicate with the host via universal serial bus interface.

11. A control method for an external electronic device, comprising:
providing an interface controller to couple a main body of the external electronic device to a host, the main body having a motor-driven hard disc as a non-volatile storage;
retrieving link information from the non-volatile storage of the main body and writing the link information into a non-volatile memory, wherein the non-volatile memory is different from the non-volatile storage implemented within the main body by the motor-driven hard disc, and the link information is not initially contained in the non-volatile memory and is written to the non-volatile memory after the motor-driven hard disc rotates stably;
transmitting a termination-on signal to the host after writing the link information into the non-volatile memory; and
using the link information stored in the non-volatile memory to respond to a link information request issued by the host in response to the termination-on signal to establish a link to the host,
wherein:
the host issues the link information request after receiving the termination-on signal wherein the termination-on signal shows that the non-volatile memory contains the link information; and
the link information request comprises at least one setup command for an enumeration process for establishing the link to the host.

12. The control method as claimed in claim 11, wherein at least one of a vendor identification number, a production identification number, a device serial number and a product string is retrieved from the main body as the link information to be written into the non-volatile memory.

13. The control method claimed in claim 11, further comprising:
determining whether the link information is stored in the non-volatile memory when a link trigger between the interface controller and the host is asserted;
when determining that the link information is not stored in the non-volatile memory, waiting for the main body to reach a stable operation; and
retrieving the link information from the main body after the main body reaches the stable operation, writing the link information retrieved from the main body into the non-volatile memory, and then transmitting the termination-on signal to the host.

14. The control method as claimed in claim 11, further comprising:
when a link trigger between the interface controller and the host is determined asserted and the link information is determined stored in the non-volatile memory, the termination-on signal is transmitted to the host in response to the asserted link trigger and the link information stored in the non-volatile memory is transmitted to the host to respond to the link information request no matter whether the main body reaches a stable operation.

15. The control method as claimed in claim 14, further comprising:

providing a sleep state indicator to indicate whether the host is resumed from sleep mode;

checking the sleep state indicator when the link trigger between the interface controller and the host is asserted; and determining that the link information is stored in the non-volatile memory when the sleep state indicator indicates that the host is resumed from sleep mode.

16. The control method as claimed in claim 14, further comprising:

providing a device indicator to indicate whether the main body has been changed;

checking the device indicator when the link trigger between the interface controller and the host is asserted; and determining that the link information is stored in the non-volatile memory when the device indicator indicates that the main body has not been changed.

* * * * *